United States Patent
Angay

(10) Patent No.: US 11,267,634 B2
(45) Date of Patent: Mar. 8, 2022

(54) VALVE AND VACUUM STORAGE BAG EQUIPPED WITH THE VALVE

(71) Applicant: Esat Angay, Izmir (TR)

(72) Inventor: Esat Angay, Izmir (TR)

(*) Notice: Subject to any disclaimer, the term of this patent is extended or adjusted under 35 U.S.C. 154(b) by 348 days.

(21) Appl. No.: 16/340,390

(22) PCT Filed: Oct. 10, 2016

(86) PCT No.: PCT/TR2016/050375
§ 371 (c)(1),
(2) Date: Apr. 9, 2019

(87) PCT Pub. No.: WO2018/070948
PCT Pub. Date: Apr. 19, 2018

(65) Prior Publication Data
US 2020/0047968 A1   Feb. 13, 2020

(51) Int. Cl.
| | | |
|---|---|---|
| *B65D 77/22* | (2006.01) | |
| *F16K 21/06* | (2006.01) | |
| *F16K 24/06* | (2006.01) | |
| *F16K 15/14* | (2006.01) | |
| *B65D 81/20* | (2006.01) | |
| *F16K 15/18* | (2006.01) | |

(52) U.S. Cl.
CPC ....... *B65D 77/225* (2013.01); *B65D 81/2038* (2013.01); *F16K 15/144* (2013.01); *F16K 15/1825* (2021.08); *F16K 21/06* (2013.01); *F16K 24/06* (2013.01)

(58) Field of Classification Search
CPC .. F16K 15/144; F16K 15/185; F16K 15/1825; F16K 21/06; F16K 24/06; Y10T 137/7895; B65D 81/2038; B65D 77/225
See application file for complete search history.

(56) References Cited

U.S. PATENT DOCUMENTS 3,245,669 A * 4/1966 Huggins ................. F16K 15/02
261/114.4
3,267,960 A * 8/1966 Warburton ............ B05B 1/3006
137/517
(Continued)

FOREIGN PATENT DOCUMENTS

CN      201761731 U    3/2011
DE       2603712 A1    8/1977
(Continued)

*Primary Examiner* — Michael R Reid
*Assistant Examiner* — Frederick D Soski
(74) *Attorney, Agent, or Firm* — Bayramoglu Law Offices LLC

(57) ABSTRACT

A valve for one-way transfer of air from vacuum storage bags, including a body, a flat diaphragm made of a flexible material, and a holder for securing the diaphragm to the body; a central portion of the body includes an air passage; the diaphragm has a first position where the air passage is covered by a central portion of the diaphragm thus blocking air flow through the air passage, and a second position where the central portion of the diaphragm is reversibly moved away from the air passage thus allowing air flow through the air passage; the diaphragm is secured between the body and the holder, at its three or more distinct edge portions of the diaphragm. A vacuum storage bag equipped with the valve.

17 Claims, 5 Drawing Sheets

(56) References Cited

U.S. PATENT DOCUMENTS

| | | | | |
|---|---|---|---|---|
| 3,799,427 A * | 3/1974 | Goglio | B65D 77/225 | 383/103 |
| 3,850,190 A * | 11/1974 | Carlson | E03C 1/108 | 137/218 |
| 4,117,856 A * | 10/1978 | Carlson | F16K 11/022 | 137/218 |
| 4,196,753 A * | 4/1980 | Hammarstedt | G05D 7/0113 | 138/43 |
| 5,025,829 A * | 6/1991 | Edwards | A61M 39/24 | 137/512 |
| 5,332,095 A * | 7/1994 | Wu | B65B 31/047 | 137/859 |
| 6,089,271 A * | 7/2000 | Tani | B65D 77/225 | 137/854 |
| 7,055,794 B1 * | 6/2006 | Tang | B65D 81/2038 | 251/100 |
| 7,475,864 B2 * | 1/2009 | Tanaka | B65D 77/225 | 206/524.8 |
| 7,510,326 B2 * | 3/2009 | Chen | B65D 77/225 | 137/543.19 |
| 8,016,261 B2 * | 9/2011 | Tang | B65D 77/225 | 251/82 |
| 8,066,433 B2 * | 11/2011 | Sabounjian | B65D 33/2541 | 383/103 |
| 9,296,541 B2 * | 3/2016 | Turvey | F16K 7/17 | |
| 9,708,099 B2 * | 7/2017 | Siu | B65D 77/225 | |
| 10,274,094 B2 * | 4/2019 | Hatami Aghdam | F16K 15/021 | |
| 2003/0122095 A1 * | 7/2003 | Wilson | A61B 5/411 | 251/12 |
| 2004/0232368 A1 * | 11/2004 | Motonaka | F16K 15/202 | 251/100 |
| 2004/0250864 A1 * | 12/2004 | Zelson | F16K 15/144 | 137/859 |
| 2005/0036718 A1 * | 2/2005 | Wu | B32B 3/04 | 383/103 |
| 2005/0190995 A1 * | 9/2005 | Koyanagi | B65D 81/2038 | 383/103 |
| 2006/0177330 A1 * | 8/2006 | Hargraves | F04B 39/14 | 417/566 |
| 2007/0095403 A1 * | 5/2007 | Su | F16K 15/028 | 137/512.15 |
| 2007/0125430 A1 * | 6/2007 | Murray | F16K 24/04 | 137/512.15 |
| 2007/0163664 A1 * | 7/2007 | Mijers | F16K 15/144 | 137/859 |
| 2007/0241023 A1 * | 10/2007 | Ootsubo | B65D 77/225 | 206/524.8 |
| 2008/0118190 A1 * | 5/2008 | Tang | B65D 81/2038 | 383/103 |
| 2009/0050512 A1 * | 2/2009 | Pham | B65D 77/225 | 206/524.8 |
| 2009/0206295 A1 * | 8/2009 | Morgan | B65D 33/2508 | 251/366 |
| 2009/0256100 A1 * | 10/2009 | Lee | F16K 3/243 | 251/331 |
| 2009/0257688 A1 * | 10/2009 | Calvo | B65D 33/2508 | 383/103 |
| 2010/0187230 A1 * | 7/2010 | Beer | F16K 15/148 | 220/89.1 |
| 2011/0216990 A1 * | 9/2011 | Lin | B65D 33/01 | 383/103 |
| 2012/0256114 A1 * | 10/2012 | Buiser | F16K 15/144 | 251/331 |
| 2017/0173322 A1 * | 6/2017 | Bonham | A61M 39/10 | |

FOREIGN PATENT DOCUMENTS

| | | |
|---|---|---|
| FR | 2593264 A1 | 7/1987 |
| FR | 2805250 A1 | 8/2001 |

\* cited by examiner (a)

(b)

VALVE AND VACUUM STORAGE BAG EQUIPPED WITH THE VALVE

CROSS REFERENCE TO THE RELATED APPLICATIONS

This application is the national phase entry of International Application No. PCT/TR2016/050375, filed on Oct. 10, 2016, the entire contents of which are incorporated herein by reference.

TECHNICAL FIELD

The present invention relates to a valve and a vacuum bag having said valve. The vacuum bag is designed to store articles such as garments in a wardrobe or in a storage bag.

BACKGROUND

Valves used in vacuum storage bags mainly allow one-way air flow from the bag. They generally comprise a diaphragm movable between two positions, one of them allowing and the other blocking the air flow. For long-term storage, such valves may comprise a pivotable or hinged lid for enhancing the air-tightness of the valve.

The vacuum storage bag valves in the market can generally be easily disassembled by mistake due to non-foolproof designs (e.g. by mistakenly forcing the hinge portion away from the valve body, instead of applying force to the lid for pivoting it around the hinged portion) or upon wearing off at their hinged portion. Once the valve is disassembled, its reassembly is not easy for every user.

Especially the diaphragm can be easily lost or incorrect montage thereof into the valve can take place, which result in leakage of air into the bag. Another and even more important problem related with the disassembly of the valve or with the loss of diaphragm is the risk of suffocation if it is found by a pet or infant prior to the user of the valve.

The same problems are valid with the vacuum storage bags equipped with the present valves. Thus, safer and enhanced valve and vacuum storage bag designs are sought for long service life and better performance in air tightness.

SUMMARY

Primary object of the present invention is to overcome the abovementioned shortcomings of the prior art.

Another object of the present invention is provision of a valve with an enhanced service life. Another object of present invention is provision of a valve with better performance in air tightness.

Yet another object of the present invention is to provide a valve with enhanced safety.

A further object of the present invention is provision of a vacuum storage bag with such desired properties.

The present invention proposes a valve for one-way transfer of air from vacuum storage bags, comprising a body, a mainly flat diaphragm made of a flexible material, and a holder for securing the diaphragm to the body; wherein a central portion of the body comprises an air passage, the diaphragm having a first position where the air passage is covered by a central portion of the diaphragm thus blocking air flow through the air passage, and a second position where the central portion of the diaphragm is reversibly moved away from the air passage thus allowing air flow through the air passage; further wherein the diaphragm is secured between the body and the holder, at its three or more evenly distributed edge portions. The present invention further proposes a vacuum storage bag equipped with such valve.

BRIEF DESCRIPTION OF THE DRAWINGS

The figures, whose brief explanation is herewith provided, are solely intended for providing a better understanding of the present invention and it is as such not intended to define the scope of protection or the context in which said scope is to be interpreted in the absence of the description.

DETAILED DESCRIPTION OF THE EMBODIMENTS

Figure 1:
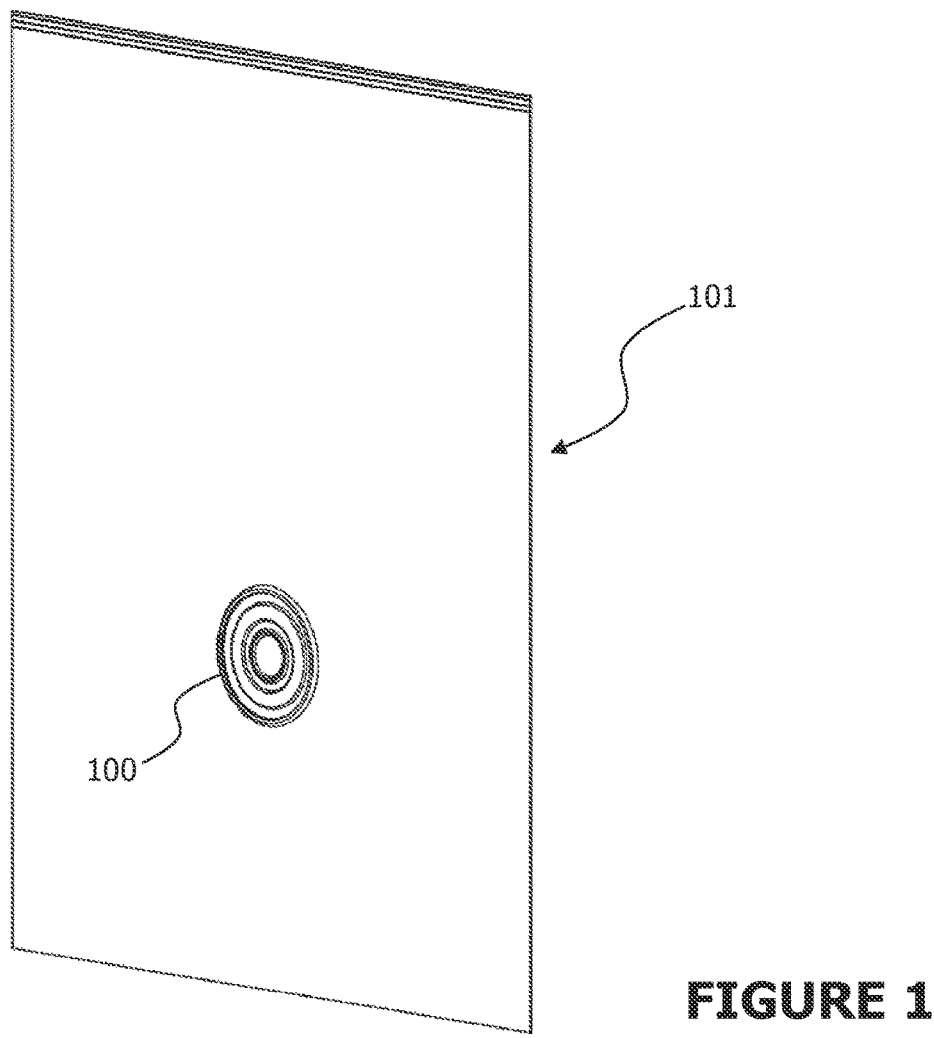
FIG. 1A shows a perspective view of a vacuum storage bag equipped with a valve.
FIG. 1B shows detail of a vacuum storage bag from a perspective where a valve thereon is closely visible.
Figure 1:
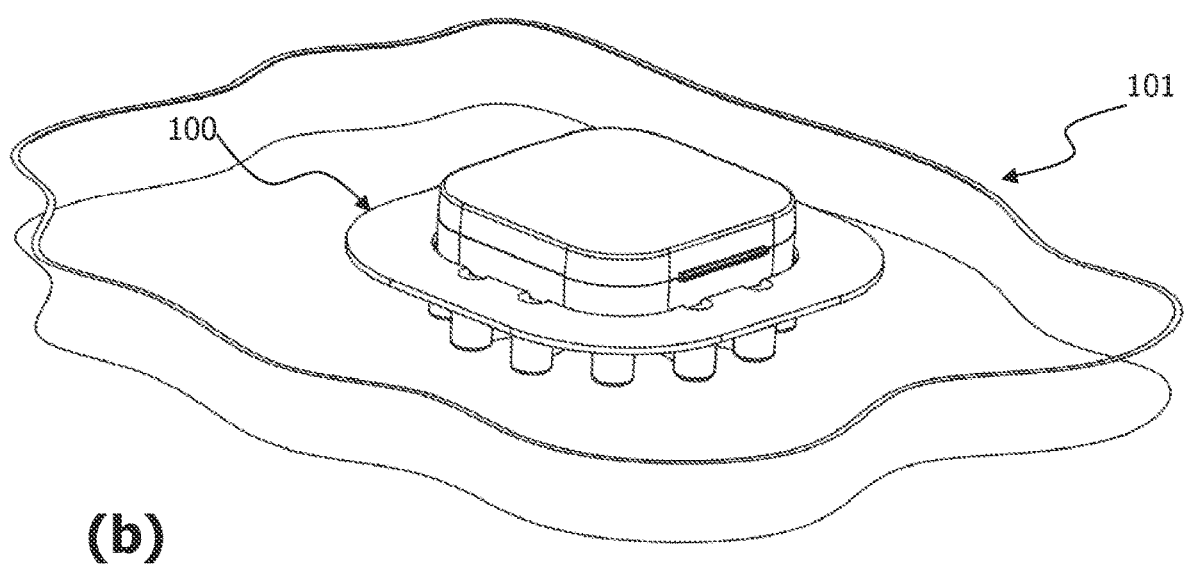
Figure 2:
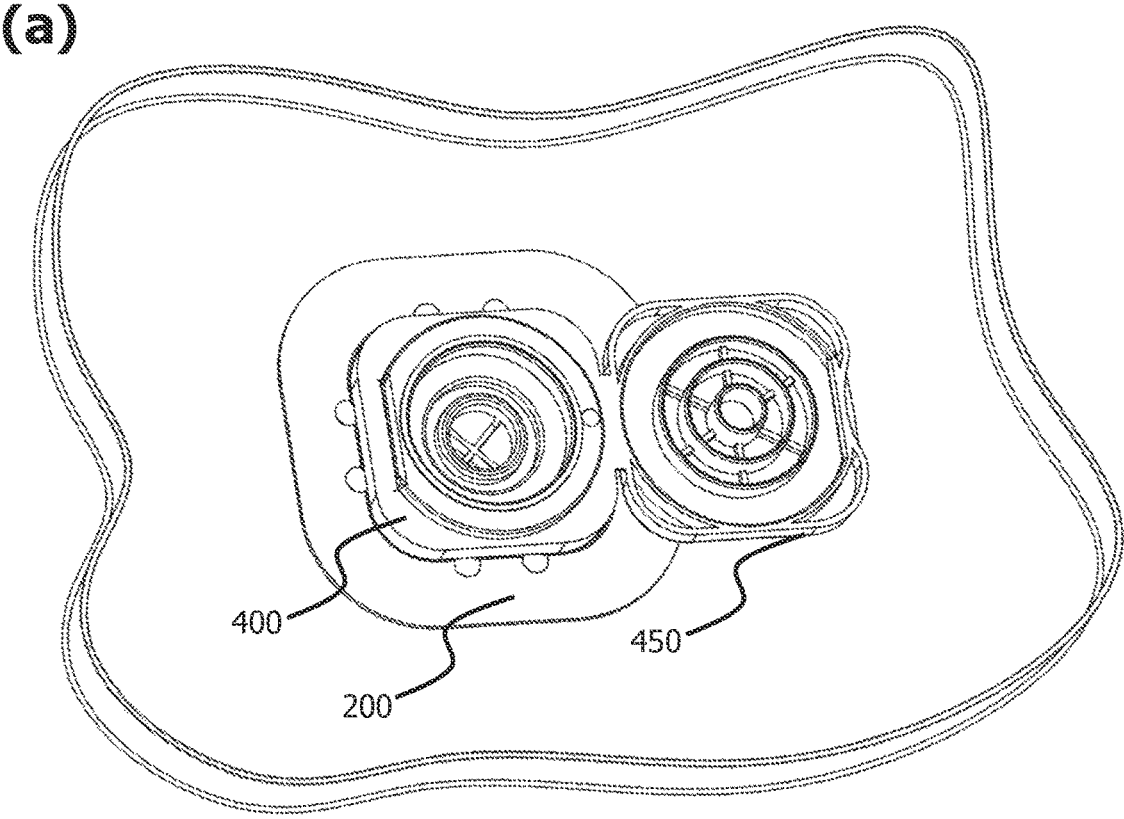
FIG. 2A shows a detailed perspective view of the storage bag of FIG. 1B with the lid in its open position (diaphragm not shown)
FIG. 2B shows a rear perspective view of the storage bag of FIG. 1B with the lid in its open position.
Figure 2:
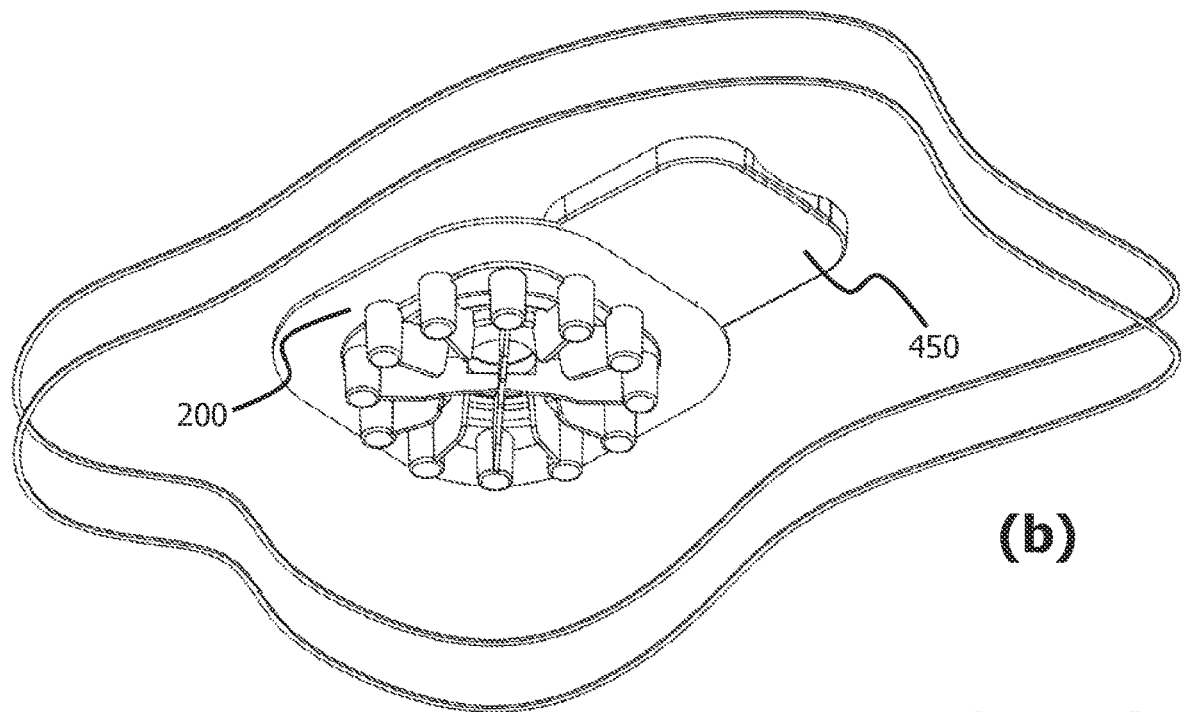

Referring now the figure outlined before, the present invention proposes a valve (100) for one-way transfer of air from vacuum storage bags (101). The valve (100) comprises a body (200), a mainly flat diaphragm (300) made of a flexible material, and a holder (400) for securing the diaphragm (300) to the body (200). The body (200) comprises an air passage (210). The diaphragm (300) has a first position where the air passage (210) is covered by a central portion (310) of the diaphragm (300), such that air flow through the air passage (210) is blocked. The diaphragm (300) has also a second position where the central portion (310) of the diaphragm (300) is reversibly moved away from the air passage (210) thus allows air flow through the air passage (210). In the valve (100) according to the present invention, the diaphragm (300) is secured between the body (200) and the holder (400), at three or more distinct edge portions (320) of the diaphragm (300). This enables an enhanced security to the diaphragm by prevention of at least partly dislocation or coming off of the diaphragm in case of breakage of any of the distinct edge portion. In case where one or even two of the distinct edge portions secured between the body and holder get damaged, the diaphragm will still maintain as a completely functional part of the valve.

In a preferred embodiment, the diaphragm (300) is secured between the body (200) and the holder (400) at its four distinct edge portions (320). Highly acceptable results in stability and robustness without sacrificing adequate fluid flow in use, added with the ease of montage and low production costs, were obtained with the embodiment with diaphragm having four distinct edge portions secured between the body and the holder.

Preferably, the distinct edge portions (320) of the diaphragm (300) are evenly distributed around a central portion (310) of the diaphragm (300). This embodiment further enhances the stability of the diaphragm especially in the second position, by evenly distributing the mechanical stresses caused by frictional forces and pressure difference between both sides of the mainly flat (planar) diaphragm to all of the distinct edge portions where the diaphragm is secured between the body and the holder. Thus, a longer service life is available by avoiding non-simultaneous wearing off of the distinct edge portions: when the forces are unevenly distributed unlike at this embodiment, the edge portions subjected to the greatest tension would fail prior to the others; and afterwards the forces pulling the central portion of the diaphragm would cause a higher load of stress at the remaining edge portions which were not yet damaged. As a result, the wearing off rate at the distinct edge portions which are not yet damaged would get higher upon higher number of damaged distinct edge portions. Hence, a higher service life is available with such embodiment according to the present invention.

Figure 3:
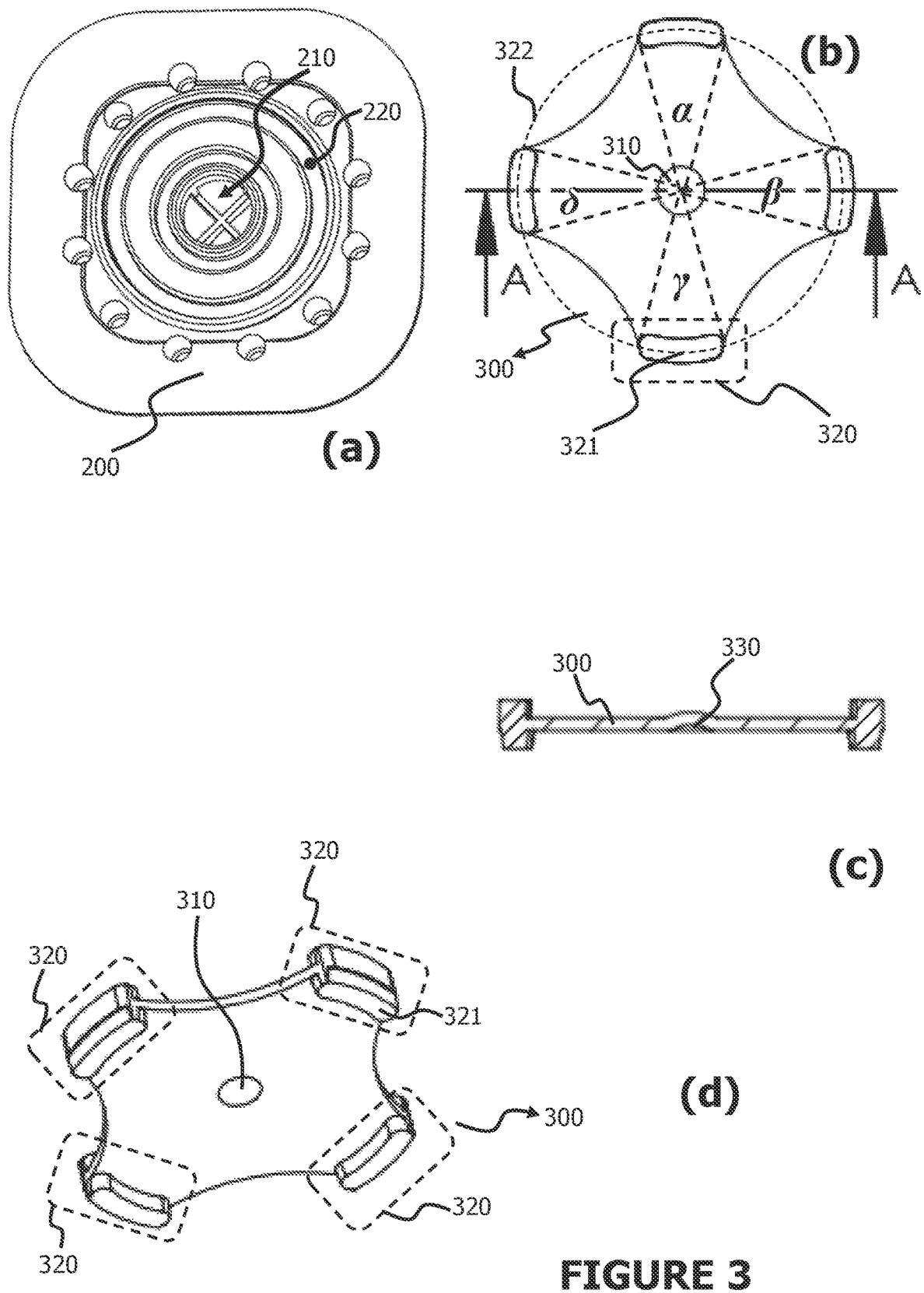
FIG. 3A shows a top view of a body.
FIG. 3B shows a top view of a diaphragm to be employed in the valve.
FIG. 3C shows A-A section of the diaphragm of FIG. 3B upon being placed onto the body.
FIG. 3D shows a perspective view of the diaphragm of FIG. 3B.

Preferably, the distinct edge portions (320) have protrusions (321) partly forming an edge of a theoretical closed geometrical shape (322) as exemplified by way of illustration in FIG. 3B. In such embodiment, the holder (400) and/or the body (200) has corresponding a groove (420 and/or 220, respectively) for receiving the protrusions (321). In other words, the distinct edge portions (320) have protrusions (321) partly forming an edge of a theoretical closed geometrical shape (322) corresponding to a groove (220 and/or 420) for receiving the protrusions (321) located on the body (200) or on the holder (400). This provides a higher stability at secure montage of the diaphragm as a part of the valve. In case where the groove(s) (220 and/or 420) is/are circular (mainly in form of a complete circle), a more flexible montage of the diaphragm (300) can be achievable notwithstanding the relative orientations of corresponding parts (body—diaphragm—holder), thus decreasing the montage cost by increasing the degree of freedom in assembly.

In the valve according to the present invention, preferably, the sum of the angles (exemplified by α, β, γ, and δ in FIG. 3B) covered by the distinct edge portions (320) around the central portion (310) of the diaphragm (300) is within the range between 170 degrees and 190 degrees when the full angle corresponds to 360 degrees. In this embodiment, about the half of the complete angular circumference of the edges of the diaphragm is secured (thus not allowing air passage but keeping the diaphragm securely in its place, at an angle of (α+β+γ+δ), and the remaining half being movable relative to the body and the air passage (thus allowing air passage, at an angle of [360−(α+β+γ+δ)]). This ratio corresponds to an optimized stability and service life at the diaphragm, by still allowing fluid flow at low friction at e.g. evacuating air from a vacuum storage bag using a household vacuum cleaner.

The holder (400) may have a pivotable lid (450) having an opened and a closed position. In this case, the holder (400) has an opening (430), a projection of which surrounds the air passage (210) and at a closed position, the lid (450) closes the opening (430) in an airtight fashion. In use, once air is extracted/evacuated from a vacuum storage bag (101), and the lid (450) is brought to the closed position, the airtightness achieved between the air passage (210) the diaphragm (300) is reinforced by the lid (450) further resisting against the pressure difference between the surrounding air and the inner side of the vacuum storage bag (101).

Figure 4:
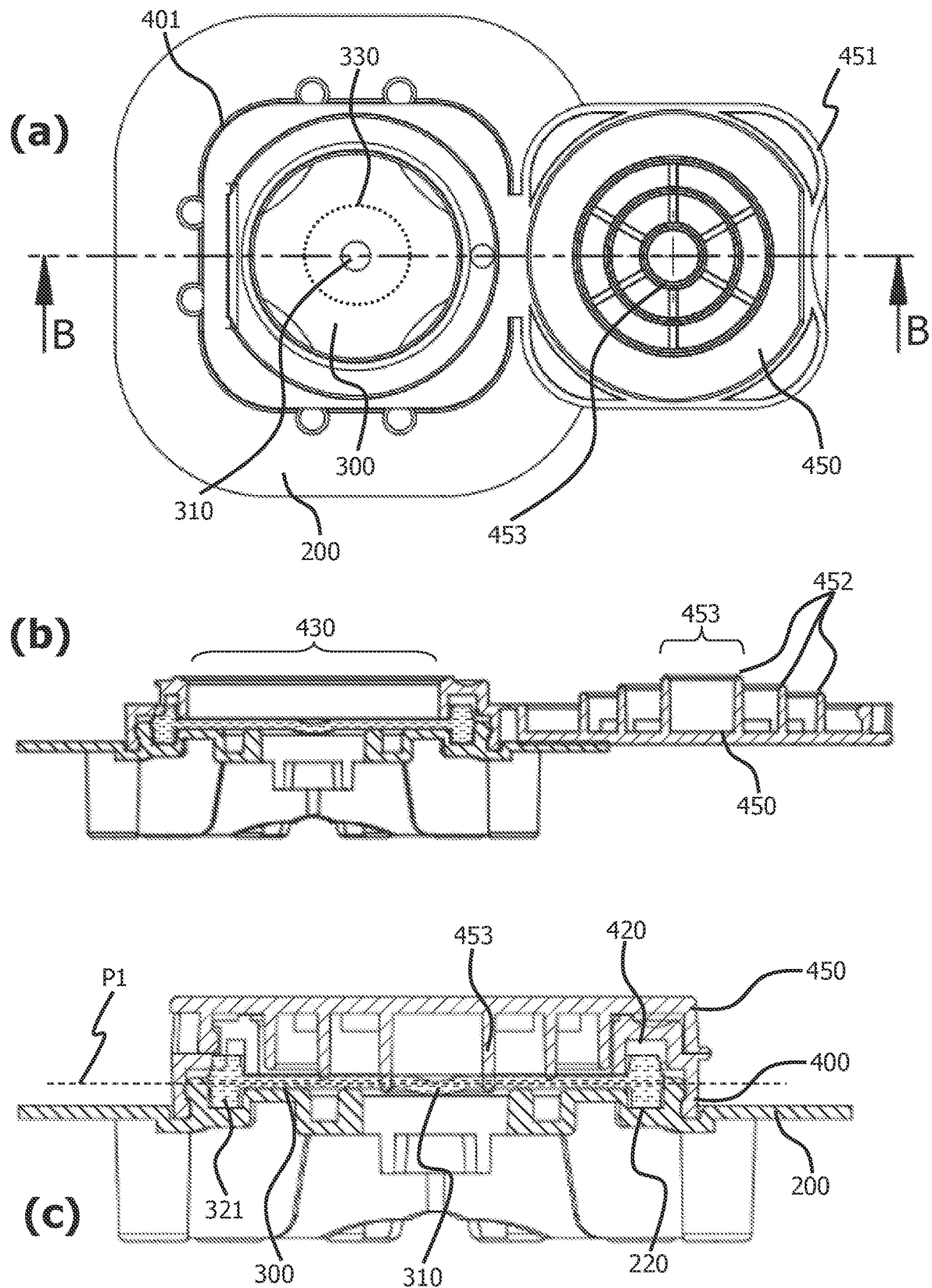
FIG. 4A shows a valve according to the present invention with the lid in an open position, where the coupling regions on the lid and the holder are emphasized.
FIG. 4B shows B-B section view of the valve according to the present invention with the lid in an open position.
FIG. 4C shows B-B section of the valve with the lid in the closed position.
Figure 5:
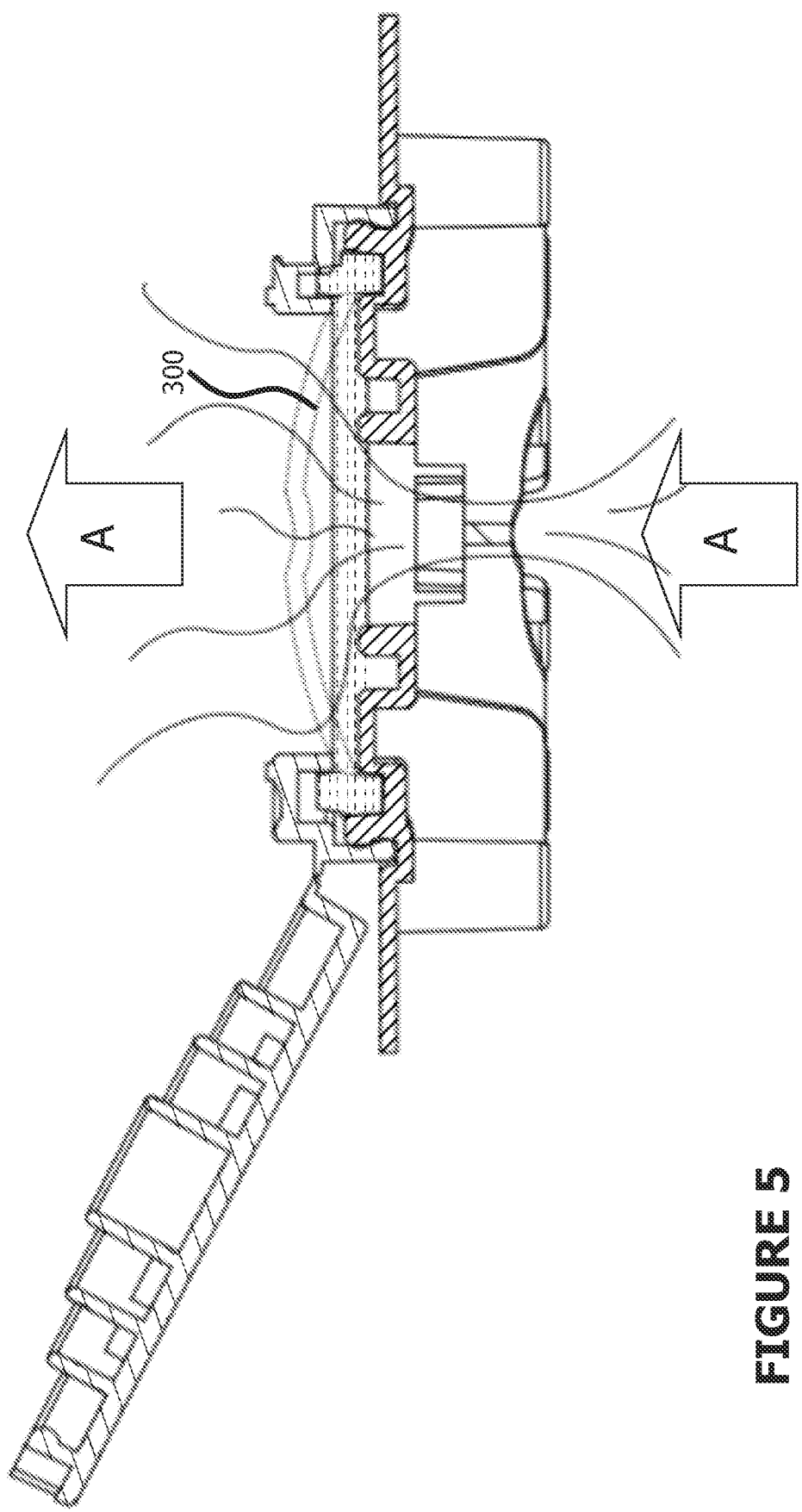
FIG. 5 illustrates the flow of air through the valve [e.g. when air is sucked towards the direction 'A' by a vacuum cleaner (not shown)] where the diaphragm is shown in its second position.

In a preferred embodiment, each of the lid (450) and the holder (400) comprise mainly polygonic coupling regions (451 and 401, respectively, both illustrated as being located between nested dashed lines in FIG. 4A) cooperating with each other; such that in the closed position, an airtight contact takes place between the lid (450) and the holder (400) at the coupling regions (451 and 401). That the coupling regions (451 and 401) have a mainly polygonic geometrical form instead of a mainly circular form results in an increased 'contact length' surrounding the area perpendicular to a main direction of potential air leakage through the valve, which can be taken as a direction of air flow (roughly shown with arrows 'A' in FIG. 5) at extraction of air from a vacuum storage bag (101) equipped with the valve (100). In case where a vacuum storage bag (101) is equipped with such valve (100) and the inner side of the vacuum storage bag (101) is decreased pressure, the tendency of air leakage into the vacuum storage bag (101) causes forces acting on the coupling regions coupling regions (451 and 401). Since the mainly polygonic coupling regions in this embodiment have an increased contact length, the distributed value of such forces on a unit length at the coupling regions has a lower value when compared to that with a mainly circular form at the coupling regions.

The mainly polygonic geometrical form of the coupling regions coupling regions (451 and 401) is preferably mainly a tetragon having four rounded corners (e.g. as illustrated in FIG. 4A). Such embodiment has at least two main benefits. First of which is that sharp corners are more delicate when compared to rounded corners as in this embodiment, therefore the coupling regions in this embodiment are less prone to getting damaged at opening and closing of the lid by a user. Secondly, the tetragonal form minimizes the tendency of misalignment of the cooperating coupling regions at closing of the lid, since the length of a hinge portion connecting the lid to the holder can be kept longer (along a mainly linear part of an edge of the lid) when compared to that at a circular (or round) lid.

The central portion (310) of the diaphragm (300) may have a concave region (330) protruding towards the air passage (210). This facilitates the distribution of the force vectors applying on the edges of the air passage (210) by the diaphragm (300) when the lid (450) is in its closed position. The diameter of the concave region (330) is preferably equal to or higher than the diameter of the air passage (210), in case where both the air passage (210) and the concave region (330) have mainly circular geometries facing each other.

The lid (450) may comprise at least two mainly circular concentric ribs (452) having different heights with respect to a direction perpendicular to a main plane (P1) of the diaphragm (300) when the lid (450) is at the closed position. The ribs (452, 453) protrude and preferably press towards the diaphragm (300) when the lid (450) is at the closed position. A central rib (453) preferably has the greatest height with respect to the rib(s) (452) surrounding it. This results in that, in the closed position of the lid (450), vicinity of a central portion (310) of the diaphragm (300) is pushed and may be partially tucked into the air passage (210) of the body, enhancing the distribution of forces applied by the diaphragm (300) to circumferential edges of the air passage (210).

The holder (400) and the body (200) are preferably coupled with each other in an irreversible fashion, i.e. disassembling the valve (100) is only possible by destruction of the valve (100). The coupling can be effectuated through e.g. a snap-fit or even more preferably a tight fit connection, which is preferably reinforced by glue at contact surfaces around zones through where the body and the holder are coupled to each other.

Furthermore, the present invention proposes a vacuum storage bag (101) equipped with a valve (100) as disclosed above. Thus, the vacuum storage bag according to the present invention inherits the above mentioned benefits of the valve.

LIST OF REFERENCE NUMBERS 100 valve
101 vacuum storage bag
200 body
210 air passage
220 groove
300 diaphragm
310 central portion
320 distinct edge portion
321 protrusion
322 theoretical closed geometric shape
330 concave region
400 holder
401 coupling region
420 groove
430 opening
450 lid
451 coupling region
452 rib
453 central rib Thus the following objects are achieved by the present invention:
overcoming the abovementioned shortcomings of the prior art,
provision of:
a valve with an enhanced service life,
a valve with better performance in air tightness,
a valve with enhanced safety
a vacuum storage bag with such properties.

What is claimed is:

1. A valve for one-way transfer of air from vacuum storage bags,
comprising: a body, a flat diaphragm made of a flexible material, and a holder for securing the diaphragm to the body; wherein
the body comprises an air passage,
the diaphragm has a first position where said air passage is covered by a central portion of the diaphragm blocking an air flow through the air passage, and a second position where the central portion of the diaphragm is reversibly moved away from the air passage allowing air flow through the air passage;
the diaphragm is secured between the body and the holder at three or more distinct edge portions of said diaphragm;
wherein a sum of angles covered by the three or more distinct edge portions around the central portion of the diaphragm is within a range of 170 degrees and 190 degrees.

2. The valve according to the claim 1, wherein the diaphragm is secured between the body and the holder at four distinct edge portions of the diaphragm.

3. The valve according to claim 2, wherein the four distinct edge portions of the diaphragm are evenly distributed around a central portion of the diaphragm.

4. The valve according to claim 2, wherein the four distinct edge portions have protrusions partly forming an edge of a theoretical closed geometrical shape corresponding to a groove for receiving the protrusions located on the body or on the holder.

5. The valve according to claim 2, wherein the central portion of the diaphragm has a concave region protruding towards the air passage.

6. The valve according to claim 1, wherein the holder has an opening, a projection of the opening surrounds the air passage and the holder comprises a pivotable lid, wherein in a closed position, the pivotable lid closes the opening in an airtight fashion.

7. The valve according to the claim 6, wherein the pivotable lid and the holder comprise polygonic coupling regions cooperating with each other; such that in the closed position, an airtight contact takes place between the lid and the holder at the coupling regions.

8. The valve according to the claim 7, wherein the coupling regions are in form of a tetragon having four rounded corners.

9. The valve according to claim 6, wherein the pivotable lid comprises at least two circular concentric ribs of different heights with respect to a direction perpendicular to a main plane of the lid and to a main plane of the diaphragm when the lid is at the closed position; the at least two circular concentric ribs protruding and pressing towards the diaphragm when the lid is at the closed position; and a central rib having a maximum height with respect to the at least two circular concentric ribs surrounds the pivotable lid.

10. The valve according to claim 1, wherein the three or more distinct edge portions of the diaphragm are evenly distributed around the central portion of the diaphragm.

11. The valve according to claim 10, wherein the three or more distinct edge portions have protrusions partly forming an edge of a theoretical closed geometrical shape corresponding to a groove for receiving the protrusions located on the body or on the holder.

12. The valve according to claim 10, wherein the central portion of the diaphragm has a concave region protruding towards the air passage.

13. The valve according to claim 1, wherein the three or more distinct edge portions have protrusions partly forming an edge of a theoretical closed geometrical shape corresponding to a groove for receiving the protrusions located on the body or on the holder.

14. The valve according to claim 13, wherein the closed geometrical shape is circular.

15. The valve according to claim 1, wherein the central portion of the diaphragm has a concave region protruding towards the air passage.

16. The valve according to claim 1, wherein the holder and the body are coupled with each other in an irreversible fashion such that disassembling the valve is only possible by destruction of the valve.

17. A vacuum storage bag equipped with the valve according to claim 1.

* * * * *